United States Patent
Wang et al.

(10) Patent No.: US 10,310,252 B1
(45) Date of Patent: Jun. 4, 2019

(54) OPTICAL WHEEL

(71) Applicant: Taiwan color optics, Inc., Taichung (TW)

(72) Inventors: Chih-Feng Wang, Taichung (TW); Yung-Peng Chang, Kaohsiung (TW)

(73) Assignee: TAIWAN COLOR OPTICS, INC., Taichung (TW)

( * ) Notice: Subject to any disclaimer, the term of this patent is extended or adjusted under 35 U.S.C. 154(b) by 0 days.

(21) Appl. No.: 15/810,043

(22) Filed: Nov. 11, 2017

(51) Int. Cl.
*G02B 5/12* (2006.01)
*G02B 26/00* (2006.01)
*H04N 9/31* (2006.01)
*G02B 27/09* (2006.01)

(52) U.S. Cl.
CPC ....... *G02B 26/008* (2013.01); *G02B 27/0905* (2013.01); *H04N 9/3114* (2013.01)

(58) Field of Classification Search
CPC .... G02B 26/008; G02B 27/0905; G02B 5/12; H04N 9/3114
USPC .......................................................... 359/524
See application file for complete search history.

(56) References Cited

U.S. PATENT DOCUMENTS

2017/0293211 A1* 10/2017 Kobayashi ............ G03B 21/00

* cited by examiner

*Primary Examiner* — Euncha P Cherry
(74) *Attorney, Agent, or Firm* — Li & Cai Intellectual Property (USA) Office (57) ABSTRACT

The instant disclosure provides an optical wheel including a rotary light-transmittable substrate, an optical microstructure layer and an optical coating layer. The rotary light-transmittable substrate has a first surface and a second surface opposite to the first surface, and rotates around a central axis. The optical microstructure is disposed on the first surface or the second surface. The optical coating layer is disposed on the optical microstructure. At least a laser incident light beam is projected onto the first surface or the second surface of the rotary light-transmittable substrate for forming a laser emission light beam emitted from the second surface.

7 Claims, 8 Drawing Sheets

OPTICAL WHEEL

BACKGROUND

1. Technical Field

The instant disclosure relates to an optical wheel, and in particular, to an optical wheel suitable for a projector.

2. Description of Related Art

One of the characteristics of a projector is that a fixed screen is not required, and hence, the size of an image displayed by the projector is not limited. As long as a plane for projecting images is presented, the projector can project an image with a large size. Therefore, projectors are widely used in many applications such as conference venues, meeting rooms or home theaters.

However, the images projected by the projectors in the existing art include color speckles which reduce the image quality of the image.

Accordingly, there is a need for providing an optical wheel which can perform light mixing of lasers having different wavelengths and eliminate the speckles for overcoming the above problems.

SUMMARY

The main object of the instant disclosure is to provide an optical wheel for overcoming the above technical problems.

An embodiment of the instant disclosure provides an optical wheel including a rotary light-transmittable substrate, an optical microstructure layer and an optical coating layer. The rotary light-transmittable substrate has a first surface and a second surface opposite to the first surface. The optical microstructure layer is disposed on the first surface or the second surface. The optical coating layer is disposed on the optical microstructure layer. At least one laser incident light beam is projected onto the first surface or the second surface of the rotary light-transmittable substrate for forming a laser emission light beam emitted from the second surface.

The advantage of the instant disclosure is that the optical wheel provided by the embodiments of the instant disclosure can achieve the object of laser light mixing and speckles elimination by the technical feature of "the optical microstructure layer is disposed on the first surface or the second surface of the rotary light-transmittable substrate".

In order to further understand the techniques, means and effects of the instant disclosure, the following detailed descriptions and appended drawings are hereby referred to, such that, and through which, the purposes, features and aspects of the instant disclosure can be thoroughly and concretely appreciated; however, the appended drawings are merely provided for reference and illustration, without any intention to be used for limiting the instant disclosure.

BRIEF DESCRIPTION OF THE DRAWINGS

The accompanying drawings are included to provide a further understanding of the instant disclosure, and are incorporated in and constitute a part of this specification. The drawings illustrate exemplary embodiments of the instant disclosure and, together with the description, serve to explain the principles of the instant disclosure.

DESCRIPTION OF THE EXEMPLARY EMBODIMENTS

Reference will now be made in detail to the exemplary embodiments of the instant disclosure, examples of which are illustrated in the accompanying drawings. Wherever possible, the same reference numbers are used in the drawings and the description to refer to the same or like parts.

First Embodiment

Figure 1:
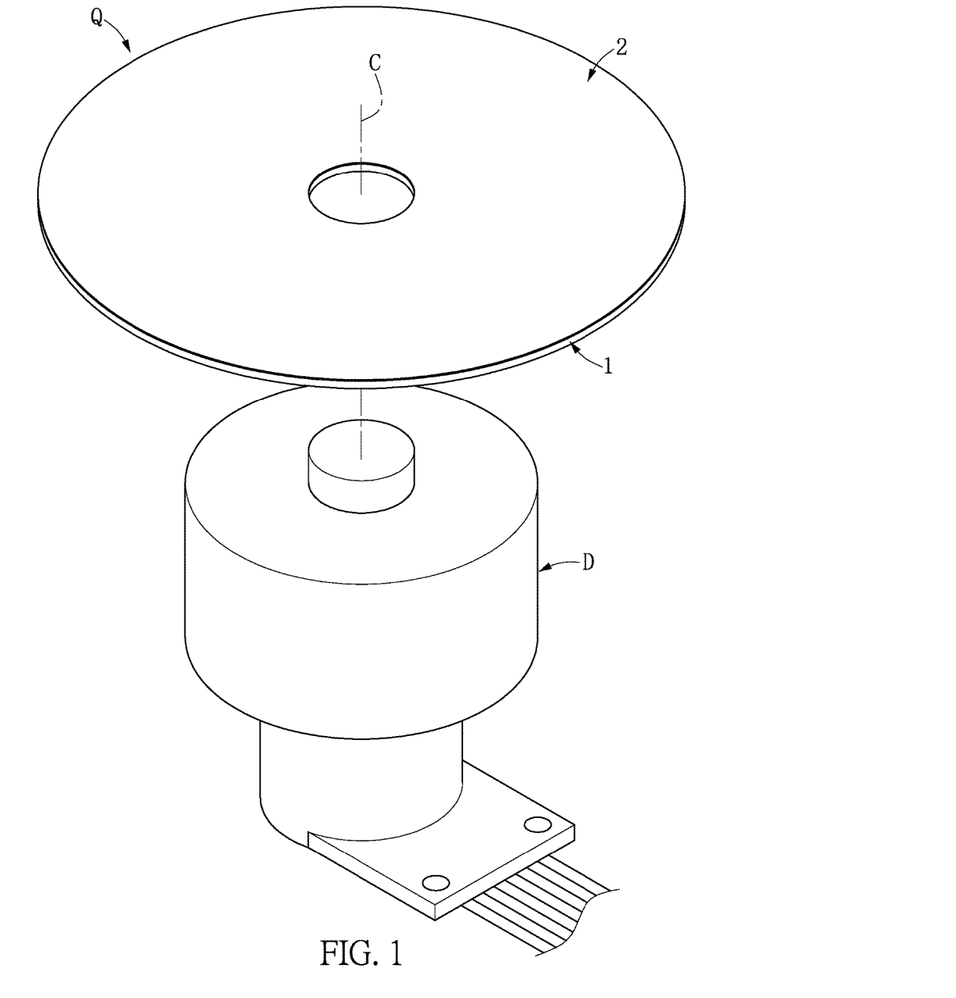
FIG. 1 is a three-dimensional exploded schematic view of an optical wheel of the first embodiment of the instant disclosure and a rotation unit.
Figure 2:
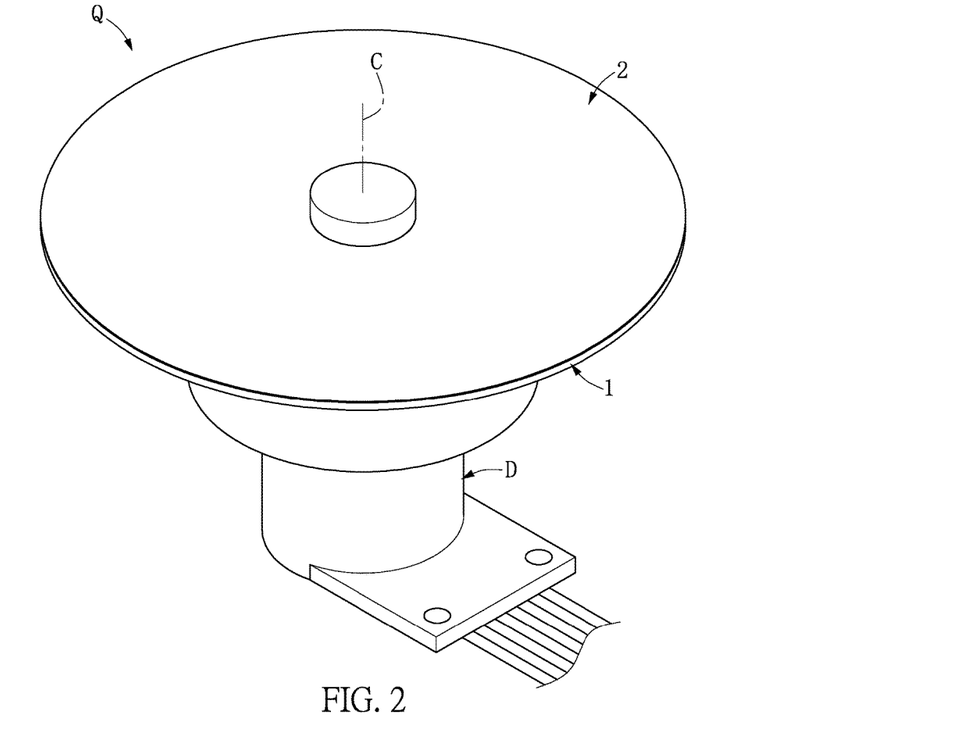
FIG. 2 is a three-dimensional assembly schematic view of the optical wheel of the first embodiment of the instant disclosure and the rotation unit.
Figure 3:
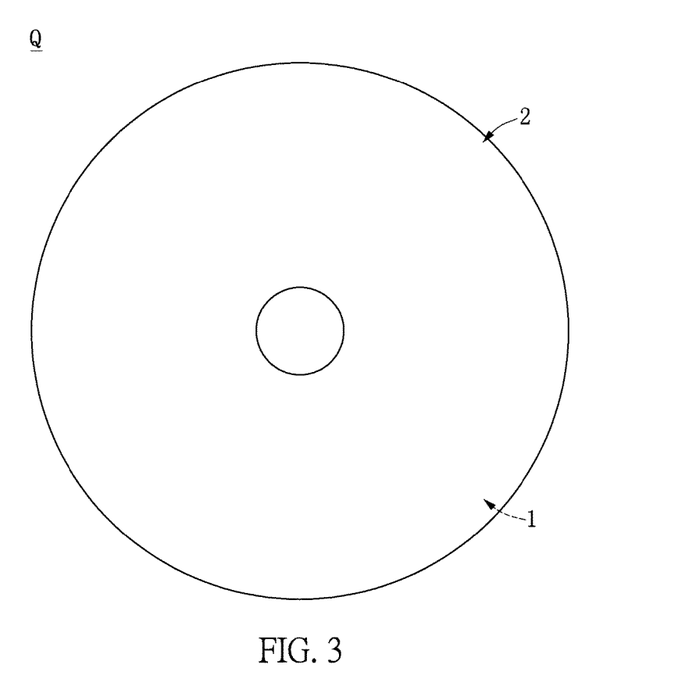
FIG. 3 is a top schematic view of the optical wheel of the first embodiment of the instant disclosure.

Reference is made to FIG. 1 to FIG. 3. The first embodiment of the instant disclosure provides an optical wheel Q for a projecting device (not shown). The optical wheel Q can be driven by a rotation unit D (such as a motor) to rotate around a central axis C. Therefore, one or a plurality of laser incident light beam(s) can be projected onto the optical wheel Q, and the optical microstructure layer M disposed on the optical wheel Q (as shown in FIG. 4 to FIG. 7) can eliminate the color speckles generated by the laser incident light beam(s).

Figure 4:
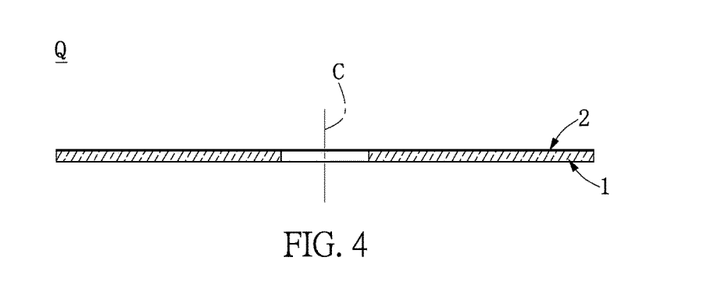
FIG. 4 is a side sectional schematic view of the optical wheel of the first embodiment of the instant disclosure.
Figure 5:
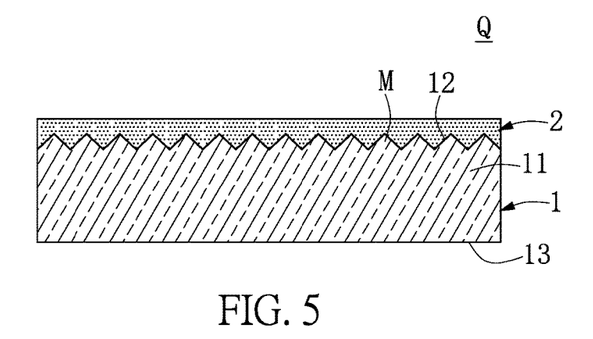
FIG. 5 is a partial sectional enlarged schematic view of the optical wheel of the first embodiment of the instant disclosure.

Reference is made to FIG. 4 and FIG. 5. It should be noted that in order to illustrate the relationship between the rotary light-transmittable substrate 1, the optical microstructure layer M and the optical coating layer 2, these figures are not depicted in actual proportion. Specifically, the optical wheel Q includes a rotary light-transmittable substrate 1, an optical microstructure layer M and an optical coating layer 2. The rotary light-transmittable substrate 1 has a body 11, a first surface 12 (an upper surface) on the rotary light-transmittable substrate 1 and a second surface 13 (a lower surface) on the rotary light-transmittable substrate 1 and opposite to the first surface 12. The rotary light-transmittable substrate 1 is capable of rotating around a central axis C. In addition, the rotary light-transmittable substrate 1 can be made of light-transparent materials such as glass materials. The glass materials can be a silicate-based, a phosphate-based, a borate-based or a tellurate-based glass material. It should be noted that in order to maintain the balance of the rotary light-transmittable substrate 1 while rotating, the rotary light-transmittable substrate 1 is substantially a flat disc with the shape of a right-circle. However, the instant disclosure is not limited thereto.

As shown in FIG. 5, the optical microstructure layer M can be disposed on the first surface 12 or the second surface 13 and at least cover 10% to 100% of the surface area of the first surface 12 or 10% to 100% of the surface area of the second surface 13. In the embodiment shown in FIG. 5, the optical coating layer 2 of the optical microstructure layer M is disposed on the first surface 12 of the rotary light-transmittable substrate 1. However, the instant disclosure is not limited thereto. It should be noted that the optical microstructure layer M can have a surface with projections, an uneven surface, a recessed surface, a surface with particulates or a matte surface by grinding, casting, printing, etching, sandblasting, matting or mold pressing processes. However, the instant disclosure is not limited thereto. In other words, the optical microstructure layer M produced by grinding, casting, printing, etching, sandblasting, matting or mold pressing processes has a material same as that of the rotary light-transmittable substrate 1. In addition, in order to achieve a better speckles-eliminating performance, the optical microstructure layer M has a roughness ranging from 0.01 micrometer ($\mu$m) to 1 micrometer.

As shown in FIG. 5, the optical coating layer 2 is disposed on the optical microstructure layer M and at least covers 10% to 100% of the surface area of the first surface 12 or 10% to 100% of the surface area of the second surface 13. It should be noted that the optical coating layer 2 can have a single-layer, a double-layer or a multi-layer structure. In addition, the optical coating layer 2 can be an anti-reflection coating or a high-reflection coating. Therefore, the one or plurality of laser incident light beam(s) projected onto the optical wheel Q can pass through the optical wheel Q by the optical coating layer 2 or be reflected by the optical wheel Q through the optical coating layer 2. It should be noted that although the optical microstructure layer M in the first embodiment shown in FIG. 5 is disposed on the first surface 12 of the rotary light-transmittable substrate 1 and the optical coating layer 2 is disposed on the optical microstructure layer M, the optical microstructure layer M and the optical coating layer 2 in other embodiments can be disposed on the second surface 13 of the rotary light-transmittable substrate 1.

Specifically, one or a plurality of laser incident light beam(s) can be projected onto the first surface 12 or the second surface 13 of the rotary light-transmittable substrate 1 for forming one or a plurality of laser emission light beam(s) emitted from the second surface 13. In other words, when the optical wheel Q includes a plurality of laser incident light beams, the laser incident light beams can form the plurality of laser emission light beams emitted from the second surface by projecting onto one of the first surface 12 and the second surface 13. The laser incident light beam emitted from the second surface 13 can be generated no matter the laser incident light beams are projected on the first surface 12 or the second surface 13, i.e., the projecting direction of the laser incident light beams are the same and these laser incident light beams are projected from the same surface. Specifically, the optical coating layer 2 can decide whether the laser incident light beams pass through the optical wheel Q or are reflected by the optical wheel Q.

Figure 6:
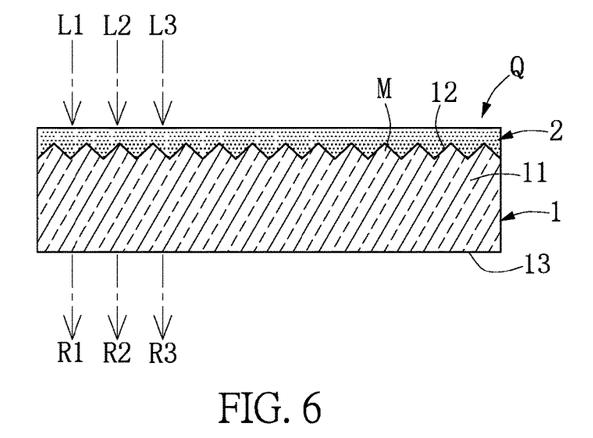
FIG. 6 is a schematic view of one of the laser light paths of the optical wheel of the first embodiment of the instant disclosure.

As shown in FIG. 6, the laser incident light beams are projected onto the first surface 12. However, in other embodiments, the laser incident light beams can be projected onto the second surface 13. In addition, in the first embodiment of the instant disclosure, at least one of the laser incident light beams is preferably a blue laser incident light beam having a wavelength ranging from 450 nanometers to 495 nanometers. It should be noted that the following descriptions are provided as an example in which the plurality of laser incident light beams are projected on the optical wheel Q. In the embodiment shown in FIG. 6, the plurality of laser light beams are projected onto the first surface 12 of the rotary light-transmittable substrate 1 for forming a plurality of laser emission light beams emitted from the second surface 13. In addition, the plurality of laser incident light beams can further include a laser incident light beam having a wavelength ranging from 495 nm to 570 nm and a laser incident light beam having a wavelength ranging from 620 nm to 750 nm. In other words, the plurality of laser incident light beams can include a blue laser incident light beam, a green laser incident light beam and a red laser incident light beam.

As shown in FIG. 6, the plurality of laser incident light beams can include a first laser incident light beam L1, a second laser incident light beam L2 and a third laser incident light beam L3. For example, the first laser incident light beam L1 is projected onto the first surface 12 of the rotary light-transmittable substrate 1 for forming a first laser emission light beam R1 emitted from the second surface 13. The second laser incident light beam L2 is projected onto the first surface 12 of the rotary light-transmittable substrate 1 for forming a second laser emission light beam R2 emitted from the second surface 13. The third laser incident light beam L3 is projected onto the first surface 12 of the rotary light-transmittable substrate 1 for forming a third laser emission light beam R3 emitted from the second surface 13. In other words, the first surface 12 is the incident surface of the optical wheel Q and the second surface 13 is the outputting (emitting) surface of the optical wheel Q. It should be noted that in other embodiments, the first laser incident light beam L1, the second laser incident light beam L2 and the third laser incident light beam L3 can be projected onto the second surface 13 of the rotary light-transmittable substrate 1 for forming the first laser emission light beam R1, the second laser emission light beam R2 and the third laser emission light beam R3 emitted from the second surface 13. In addition, for example, the first laser incident light beam L1 has a wavelength ranging from 450 to 495 nm, the second laser incident light beam L2 has a wavelength ranging from 495 to 570 nm, and the third laser incident light beam L3 has a wavelength ranging from 620 to 750 nm. However, the instant disclosure is not limited thereto.

In the embodiment shown in FIG. 6, the optical coating layer 2 can be an anti-reflection film and the plurality of laser incident light beams (the first laser incident light beam L1, the second laser incident light beam L2 and the third laser incident light beam L3) are projected onto the first surface 12 of the rotary light-transmittable substrate 1 for forming the plurality of emission light beams (the first laser emission light beam R1, the second laser emission light beam R2 and the third laser emission light beam R3) emitted from the second surface 13 respectively. Therefore, the first laser incident light beam L1, the second laser incident light beam L2 and the third laser incident light beam L3 can pass through the optical coating layer 2, the optical microstructure layer M, the first surface 12 of the rotary light-transmittable substrate 1, the body 11 of the rotary light-transmittable substrate 1 and the second surface 13 of the rotary light-transmittable substrate 1 sequentially and form the first laser emission light beam R1, the second laser emission light beam R2 and the third laser emission light beam R3 emitted from the second surface 13. It should be noted that in the instant embodiment, in order to increase the light-mixing and speckles-eliminating effects of the first laser incident light beam L1, the second laser incident light beam L2 and the third laser incident light beam L3 after passing the optical wheel Q, the optical microstructure layer M has a roughness ranging from 0.01 to 1 μm, and the optical coating layer 2 has a reflectivity ranging from 1.2 to 1.9.

Figure 7:
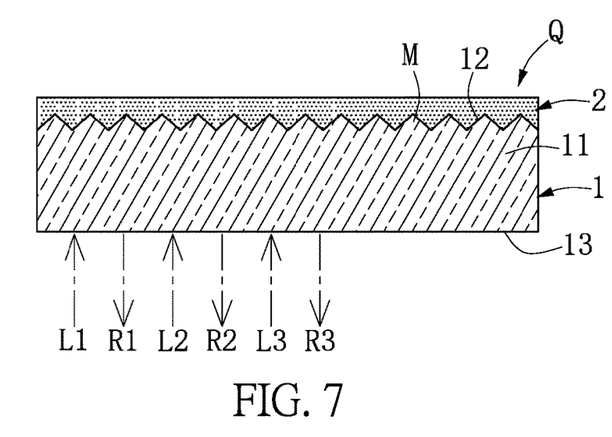
FIG. 7 is a schematic view of another laser light paths of the optical wheel of the first embodiment of the instant disclosure.

Reference is made to FIG. 7. In the embodiment shown in FIG. 7, the plurality of laser incident light beams (the first laser incident light beam L1, the second laser incident light beam L2 and the third laser incident light beam L3) are projected onto the second surface 13 of the rotary light-transmittable substrate 1 for forming a plurality of laser emission light beams (the first laser emission light beam R1 the second laser emission light beam R2 and the third laser emission light beam R3) emitted from the second surface 13. In addition, the optical coating layer 2 can be a high reflectance film, and the plurality of laser incident light beams can be reflected from the second surface 13 under the consideration of the overall structure design of the projector. In other words, the plurality of laser incident light beams can pass through the second surface 13 of the rotary light-transmittable substrate 1, the body 11 of the rotary light-transmittable substrate 1, the first surface 12 of the rotary light-transmittable substrate 1, the optical microstructure layer M and the optical coating layer 2 sequentially and be reflected by the optical coating layer 2 for emitting from the second surface 13 of the rotary light-transmittable substrate 1. It should be noted that in the present embodiment, in order to increase the light-mixing and speckles-eliminating effects of the first laser incident light beam L1, the second laser incident light beam L2 and the third laser incident light beam L3 after passing the optical wheel Q, the optical microstructure layer M has a roughness ranging from 0.01 to 1 μm, and the optical coating layer 2 has a reflectivity ranging from 1.2 to 1.9.

Figure 8:
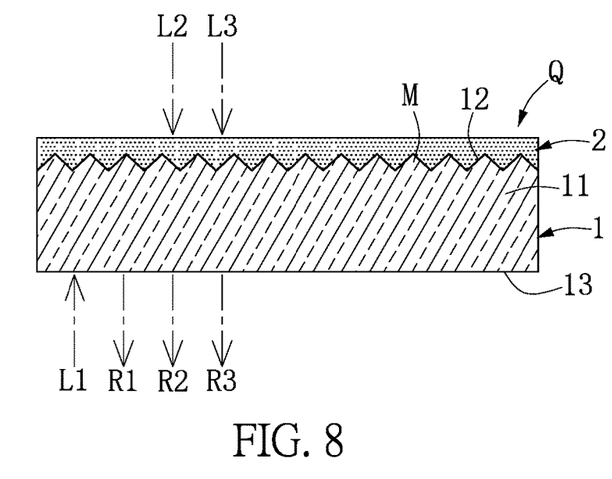
FIG. 8 is a schematic view of yet another laser light paths of the optical wheel of the first embodiment of the instant disclosure.

Reference is made to FIG. 8. In the embodiment shown in FIG. 8, one of the laser incident light beams is projected onto the first surface 12 of the rotary light-transmittable substrate 1 for forming one of the laser emission light beams emitted from the second surface 13. Another one of the laser incident light beams is projected onto the second surface 13 of the rotary light-transmittable substrate 1 for forming another one of the laser emission light beams emitted from the second surface 13. In other words, based on the material selection of the optical coating layer 2, a part of the laser incident light beams can pass through the second surface 13 and be emitted away from the second surface 13, and another part of the laser incident light beam can be reflected by the second surface 13 and travel away from the second surface 13.

Specifically, as shown in FIG. 8, the second laser incident light beam L2 and the third laser incident light beam L3 can pass through the optical coating layer 2, the optical microstructure layer M, the first surface 12 of the rotary light-transmittable substrate 1, the body 11 of the rotary light-transmittable substrate 1 and the second surface 13 of the rotary light-transmittable substrate 1 sequentially for forming the second laser emission light beam R2 and the third laser emission light beam R3 emitted from the second surface 13. The first laser incident light beam L1 can project onto the second surface 13 of the rotary light-transmittable substrate 1 and pass through the body 11 of the rotary light-transmittable substrate 1, the first surface 12 of the rotary light-transmittable substrate 1, the optical microstructure layer M and the optical coating layer 2 sequentially, then be reflected by the optical coating layer 2 and emit from the second surface 13 of the rotary light-transmittable substrate 1. In other words, the optical coating layer 2 has a transmittance which enables the second laser incident light beam L2 and the third laser incident light beam L3 to transmit, and a reflectivity for reflecting the first laser incident light beam L1.

Second Embodiment

Figure 9:
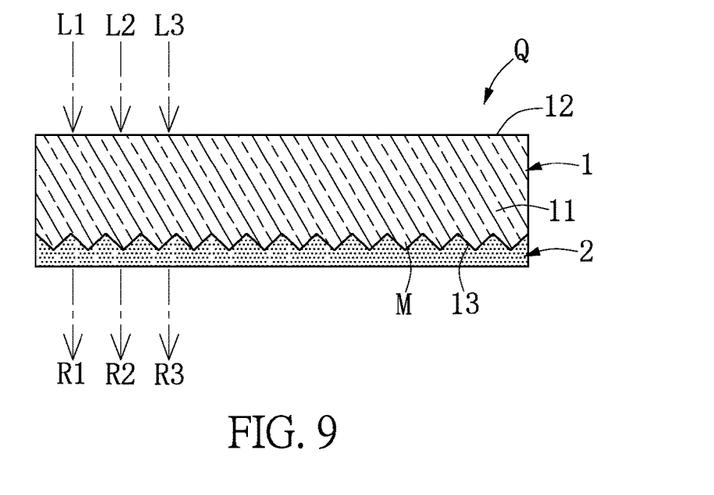
FIG. 9 is a schematic view of one of the laser light paths of the optical wheel of the second embodiment of the instant disclosure.

Reference is made to FIG. 9. Comparing FIG. 9 to FIG. 6, the main difference between the optical wheel Q of the second embodiment and the optical wheel Q of the first embodiment is that the optical wheel Q of the second embodiment has an optical microstructure layer M and an optical coating layer 2 disposed on the second surface 13 of the rotary light-transmittable substrate 1. It should be noted that the structural features of the optical wheel Q provided in the second embodiment are similar to that of the first embodiment and are not reiterated herein. The projecting paths of the plurality of laser incident light beams are described in detail below.

As shown in FIG. 9, for example, the optical coating layer 2 can be an anti-reflection film. Therefore, the plurality of laser incident light beams (the first laser incident light beam L1, the second laser incident light beam L2, and the third laser incident light beam L3) can sequentially pass through the second surface 13 of the rotary light-transmittable substrate 1, the body 11 of the rotary light-transmittable substrate 1, the first surface 12 of the rotary light-transmittable substrate 1, the optical microstructure layer M and the optical coating layer 2 for forming the plurality of laser emission light beams emitted from the second surface 13 (the first laser emission light beam R1, the second laser emission light beam R2 and the third laser emission light beam R3). It should be noted that in the present embodiment, in order to increase the light-mixing and speckles-eliminating effects of the first laser incident light beam L1, the second laser incident light beam L2 and the third laser incident light beam L3 after passing the optical wheel Q, the optical microstructure layer M has a roughness ranging from 0.01 to 1 μm, and the optical coating layer 2 has a reflectivity ranging from 1.2 to 1.9.

Figure 10:
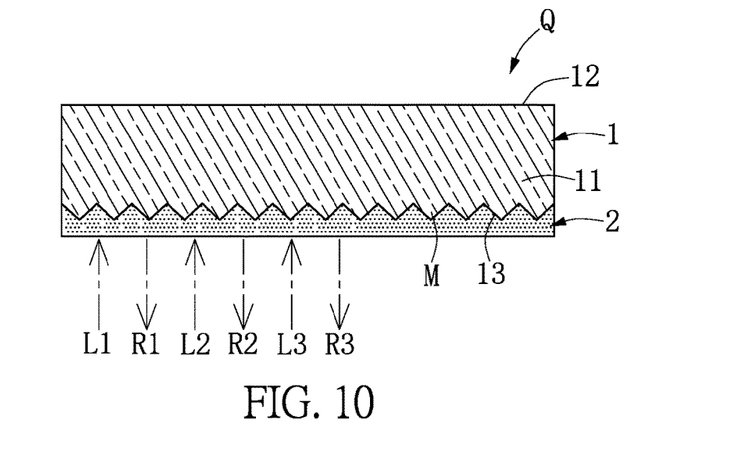
FIG. 10 is a schematic view of another laser light paths of the optical wheel of the second embodiment of the instant disclosure.

Reference is made to FIG. 10. For example, the optical coating layer 2 is a high reflectance film, and hence, the plurality of laser incident light beams (the first laser incident light beam L1, the second laser incident light beam L2 and the third laser incident light beam L3) can be reflected by the optical coating layer 2 and emit from the second surface 13 of the rotary light-transmittable substrate 1 for forming the plurality of laser emission light beams (the first laser emission light beam R1, the second laser emission light beam R2 and the third laser emission light beam R3).

Figure 11:
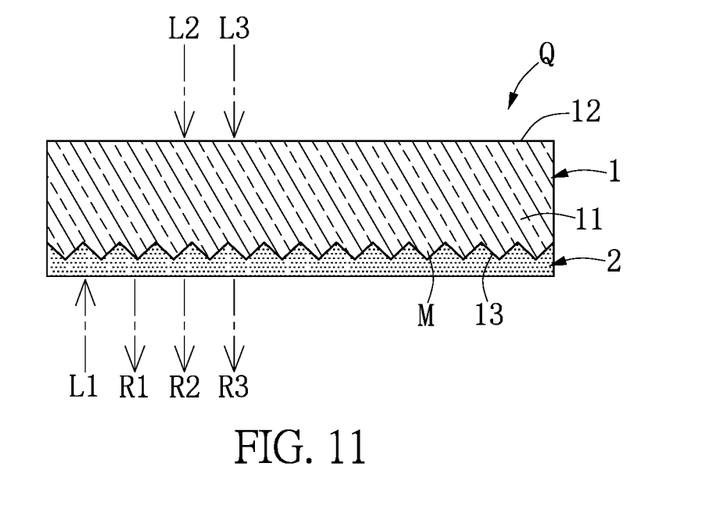
FIG. 11 is a schematic view of yet another laser light paths of the optical wheel of the second embodiment of the instant disclosure.

Reference is made to FIG. 11. In the embodiment shown in FIG. 11, the optical coating layer 2 can have a transmittance which enables the second laser incident light beam L2 and the third laser incident light beam L3 to pass through, and a reflectivity which enables the optical coating layer 2 to reflect the first laser incident light beam L1. Therefore, the second laser incident light beam L2 and the third laser incident light beam L3 can pass through the first surface 12 of the rotary light-transmittable substrate 1, the body 11 of the rotary light-transmittable substrate 1, the second surface 13 of the rotary light-transmittable substrate 1, the optical microstructure layer M and the optical coating layer 2 sequentially for forming the second laser emission light beam R2 and the third laser emission light beam R3 emitted from the second surface 13. In addition, the first laser incident light beam L1 can be projected onto the optical coating layer 2 and reflected by the optical coating layer 2, then emit from the second surface 13 of the rotary light-transmittable substrate 1.

Third Embodiment

Figure 12:
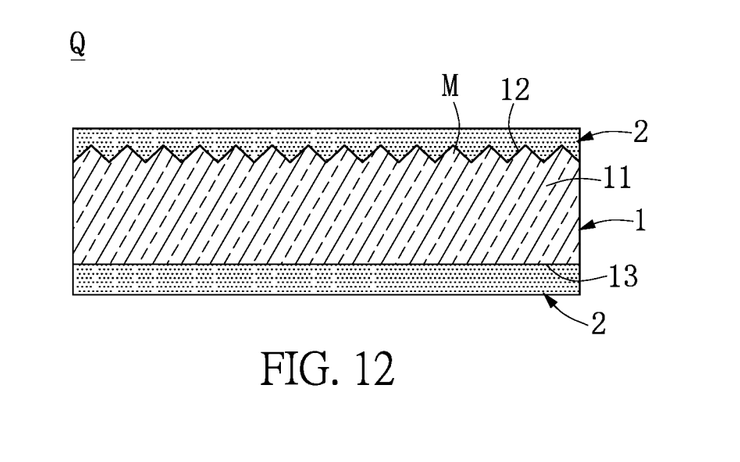
FIG. 12 is a partial enlarged view of a side sectional schematic view of an optical wheel of the third embodiment of the instant disclosure.

Reference is made to FIG. 12. Comparing FIG. 12 and FIG. 5, the main difference between the optical wheel Q provided by the third embodiment and the optical wheel Q provided by the first embodiment is that the optical wheel Q provided by the third embodiment further includes an optical coating layer 2 disposed on the second surface 13 of the rotary light-transmittable substrate 1. Therefore, the light-mixing effect of the plurality of laser incident light beams can be changed.

In addition, it should be noted that the projecting paths of the plurality of laser incident light beams related to the optical coating layer 2 of the third embodiment are similar to that described in the first and second embodiments, and are not reiterated herein.

Fourth Embodiment

Figure 13:
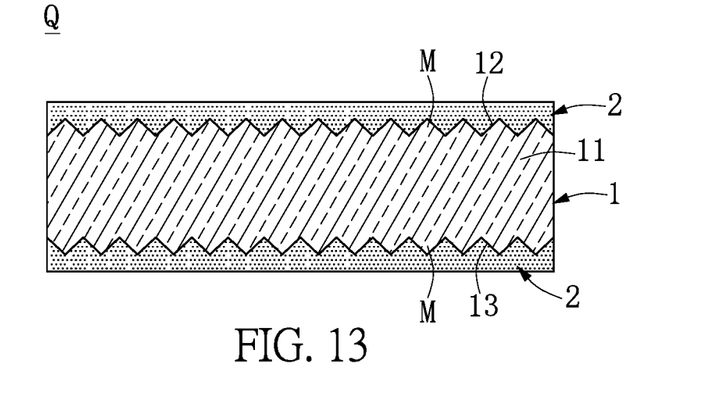
FIG. 13 is a partial enlarged view of a side sectional schematic view of an optical wheel of the fourth embodiment of the instant disclosure.

Reference is made to FIG. 13. Comparing FIG. 13 to FIG. 5, the main difference between the optical wheel Q provided by the fourth embodiment and the optical wheel Q provided by the first embodiment is that the optical wheel Q of the fourth embodiment further includes an optical microstructure layer M disposed on the second surface 13 of the rotary light-transmittable substrate 1 and an optical coating layer 2 disposed on the optical microstructure layer M. Therefore, the optical microstructure layer M disposed on the second surface 13 of the rotary light-transmittable substrate 1 and the optical coating layer 2 disposed on the optical microstructure layer M can further change the light-mixing effect of the plurality of laser incident light beams.

In addition, it should be noted that the projecting paths of the plurality of laser incident light beams related to the optical coating layer 2 of the fourth embodiment are similar to that described in the first and second embodiments, and are not reiterated herein.

In summary, the advantage of the instant disclosure is that the use of "the optical microstructure layer M" of the optical wheel Q provided by the embodiments of the instant disclosure can achieve the effect of light-mixing and eliminate the speckles.

The above-mentioned descriptions represent merely the exemplary embodiment of the present disclosure, without any intention to limit the scope of the instant disclosure thereto. Various equivalent changes, alterations or modifications based on the claims of the instant disclosure are all consequently viewed as being embraced by the scope of the instant disclosure.

What is claimed is:

1. An optical wheel, comprising:
a rotary light-transmittable substrate having a first surface and a second surface opposite to the first surface;
an optical microstructure layer disposed on the first surface or the second surface, wherein the optical microstructure layer and the rotary light-transmittable substrate are made of the same material and a roughness of the optical microstructure layer ranges from 0.01 to 1 µm; and
an optical coating layer disposed on the optical microstructure layer;
wherein at least one laser incident light beam is projected onto the first surface or the second surface of the rotary light-transmittable substrate and passes through the optical microstructure layer for forming at least one laser emission light beam emitted from the second surface.

2. The optical wheel according to claim 1, wherein the optical wheel comprises a plurality of laser incident light beams projected onto the first surface or the second surface of the rotary light-transmittable substrate for forming a plurality of laser emission light beams emitted from the second surface.

3. The optical wheel according to claim 2, wherein the plurality of laser incident light beams include a laser incident light beam having a wavelength ranging from 450 to 495 nanometers, a laser incident light beam having a wavelength ranging from 495 to 570 nanometers and a laser incident light beam having a wavelength ranging from 620 to 750 nanometers.

4. The optical wheel according to claim 2, wherein all of the plurality of laser incident light beams are projected onto the first surface of the rotary light-transmittable substrate for forming the plurality of laser emission light beams emitted from the second surface.

5. The optical wheel according to claim 2, wherein all of the plurality of laser incident light beams are projected onto the second surface of the rotary light-transmittable substrate for forming the plurality of laser emission light beams emitted from the second surface.

6. The optical wheel according to claim 2, wherein one of the laser incident light beams is projected onto the first surface of the rotary light-transmittable substrate for forming one of the plurality of laser emission light beams emitted from the second surface, and another one of the laser incident light beams is projected onto the second surface of the rotary light-transmittable substrate for forming another one of the plurality of laser emission light beams emitted from the second surface.

7. The optical wheel according to claim 1, wherein the optical microstructure layer is disposed on the first surface and the second surface.

* * * * *